United States Patent
Zhang et al.

(10) Patent No.: US 11,243,792 B2
(45) Date of Patent: Feb. 8, 2022

(54) IMAGE FILE CONVERSION METHOD AND APPARATUS

(71) Applicant: HUAWEI TECHNOLOGIES CO., LTD., Guangdong (CN)

(72) Inventors: Guang Zhang, Xi'an (CN); Sibiao Luo, Beijing (CN); Wanqing Hu, Xi'an (CN); Lin Gao, Xi'an (CN); Jing Lin, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 15/921,929

(22) Filed: Mar. 15, 2018

(65) Prior Publication Data

US 2018/0203719 A1    Jul. 19, 2018

Related U.S. Application Data

(63) Continuation of application No. PCT/CN2016/106262, filed on Nov. 17, 2016.

(51) Int. Cl.
*G06F 9/455*    (2018.01)
*G06F 3/06*     (2006.01)
(Continued)

(52) U.S. Cl.
CPC ........ *G06F 9/45558* (2013.01); *G06F 3/0647* (2013.01); *G06F 8/447* (2013.01);
(Continued)

(58) Field of Classification Search
CPC ....... G06F 16/1794; G06F 2009/45562; G06F 2009/4557; G06F 2009/45579;
(Continued)

(56) References Cited

U.S. PATENT DOCUMENTS

| 7,330,967 | B1 * | 2/2008 | Pujare | G06F 8/63 |
| | | | | 713/100 |
| 7,334,157 | B1 * | 2/2008 | Graf | G06F 8/63 |
| | | | | 714/13 |

(Continued)

FOREIGN PATENT DOCUMENTS

| CN | 101465770 A | 6/2009 |
| CN | 102521063 A | 6/2012 |

(Continued)

OTHER PUBLICATIONS

Libguest, Tools for Accessing and Modifying Virtual Machine Disk Images, Jul. 1, 2016, web.archive.org/web/20160702101956/https://libguestfs.org/ (Year: 2016).*

(Continued)

*Primary Examiner* — Jorge A Chu Joy-Davila
(74) *Attorney, Agent, or Firm* — Fish & Richardson P.C.

(57) ABSTRACT

An image file conversion method includes: obtaining an original image file of a virtual machine on an original platform; detecting whether the original image file has a first file characteristic and a second file characteristic that are corresponding to a target platform, wherein the first file characteristic comprises a target driver used when the virtual machine runs on the target platform, and the second file characteristic comprises a target file format supported by the target platform; and changing, in response to detecting that the original image file does not have at least one of the first file characteristic or the second file characteristic, the original image file by calling a predetermined interface, to obtain a target image file of the virtual machine on the target platform, wherein the target image file has the first file characteristic and the second file characteristic.

12 Claims, 6 Drawing Sheets

(51) Int. Cl.
  *G06F 16/178* (2019.01)
  *G06F 8/61* (2018.01)
  *G06F 8/41* (2018.01)
  *G06F 8/52* (2018.01)

(52) U.S. Cl.
  CPC .............. *G06F 8/52* (2013.01); *G06F 8/63* (2013.01); *G06F 16/1794* (2019.01); *G06F 2009/4557* (2013.01); *G06F 2009/45562* (2013.01); *G06F 2009/45579* (2013.01)

(58) Field of Classification Search
  CPC .......... G06F 3/0647; G06F 8/447; G06F 8/52; G06F 8/63; G06F 9/45558; G06F 8/76; G06F 9/45533
  See application file for complete search history.

(56) References Cited

U.S. PATENT DOCUMENTS

| | | | |
|---|---|---|---|
| 7,356,679 B1* | 4/2008 | Le | G06F 9/45558 713/1 |
| 7,383,327 B1* | 6/2008 | Tormasov | H04L 41/082 709/220 |
| 8,112,505 B1 | 2/2012 | Ben-Shaul et al. | |
| 8,990,804 B1* | 3/2015 | Lissack | G06F 9/45533 718/1 |
| 2009/0006534 A1 | 1/2009 | Fries et al. | |
| 2010/0174943 A1 | 7/2010 | Liu et al. | |
| 2011/0307531 A1* | 12/2011 | Gaponenko | G06F 8/63 707/822 |
| 2012/0243795 A1* | 9/2012 | Head | G06T 11/60 382/218 |
| 2013/0268643 A1 | 10/2013 | Chang et al. | |
| 2014/0359618 A1 | 12/2014 | Fontignie et al. | |
| 2016/0191623 A1* | 6/2016 | Vasudevan | H04L 29/06 709/201 |
| 2019/0258499 A1* | 8/2019 | Annapragada | G06F 9/45541 |

FOREIGN PATENT DOCUMENTS

| | | |
|---|---|---|
| CN | 103092650 A | 5/2013 |
| CN | 103491144 A | 1/2014 |
| CN | 103530144 A | 1/2014 |
| CN | 103975306 A | 8/2014 |
| CN | 105159760 A | 12/2015 |
| CN | 105260226 A | 1/2016 |
| CN | 105573830 A | 5/2016 |

OTHER PUBLICATIONS

Extended European Search Report issued in European Application No. 16909067.7 dated Jun. 5, 2019, 9 pages.
International Search Report and Written Opinion in International Application No. PCT/CN2016/106262, dated Aug. 23, 2017, 12 pages.
Office Action issued in Chinese Application No. 201680003656.6 dated Jun. 25, 2019, 8 pages.
Office Action issued in Chinese Application No. 201680003656.6 dated Oct. 10, 2020, 15 pages (with English translation).
Extended European Search Report issued in European Application No. 20209495.9 dated May 7, 2021, 10 pages.

* cited by examiner

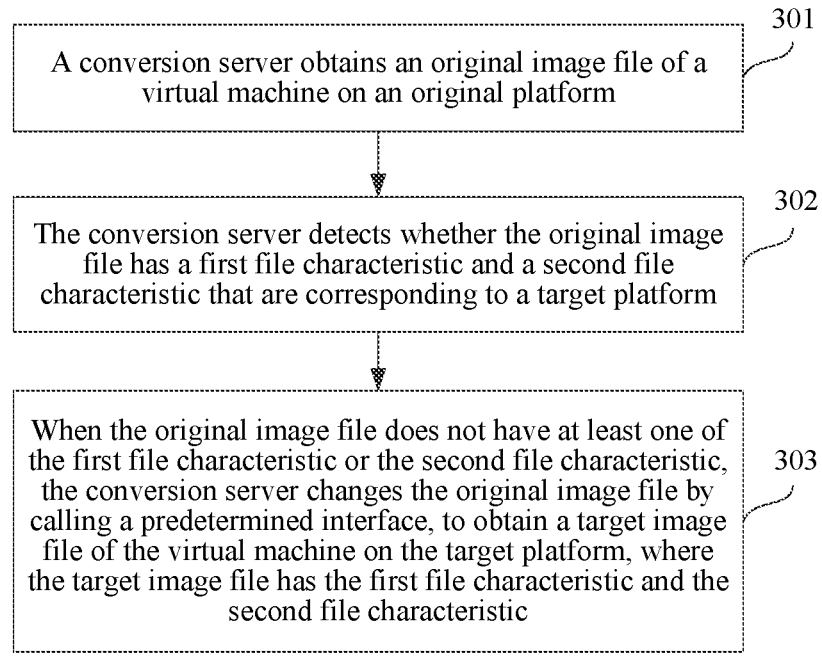
FIG. 3
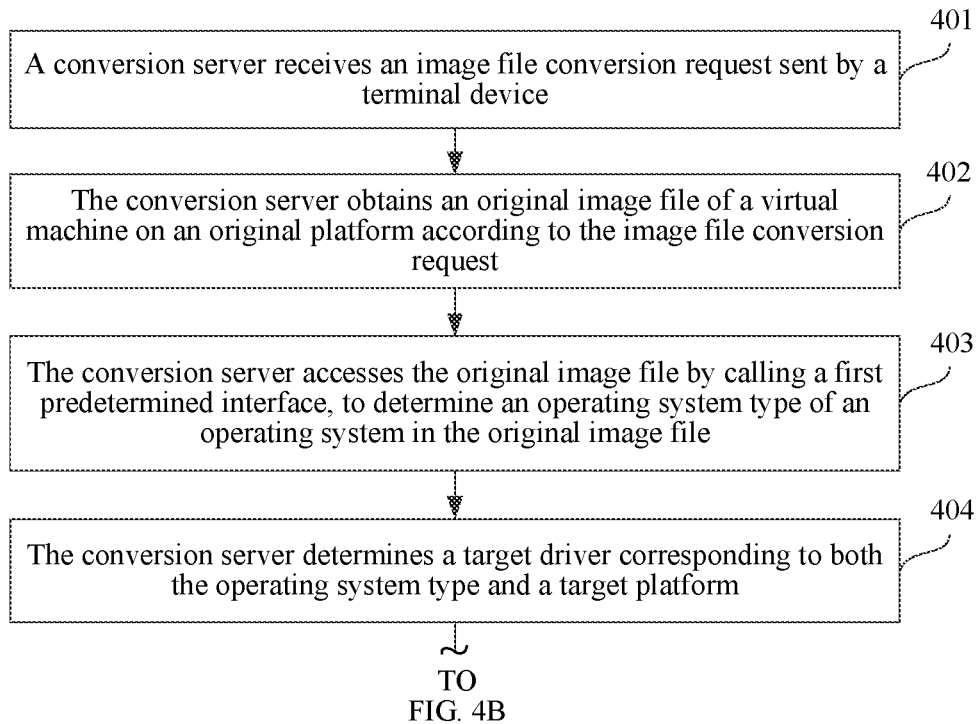
TO
FIG. 4B
FIG. 4A

IMAGE FILE CONVERSION METHOD AND APPARATUS

CROSS-REFERENCE TO RELATED APPLICATIONS

This application is a continuation of International Application No. PCT/CN2016/106262, filed on Nov. 17, 2016, the disclosure of which is hereby incorporated by reference in its entirety.

TECHNICAL FIELD

Embodiments of this disclosure relate to the field of virtualization technologies, and in particular, to an image file conversion method and apparatus.

BACKGROUND

When virtual machines are migrated in batches between two different platforms, for example, when the virtual machines are migrated from an original platform to a target platform, a virtual machine that has been deployed on the original platform needs to be exported as an image file, and then, the image file is imported to the target platform, so that the imported image file is used to create virtual machines in batches on the target platform. An image file of a virtual machine is a template for creating a virtual machine.

Usually, an original platform and a target platform use different drivers, and/or the original platform and the target platform support different file formats. Therefore, an original image file exported from the original platform cannot be normally used on the target platform. In the prior art, an original image file needs to be started as an original virtual machine first. Then, a driver of the original virtual machine is uninstalled manually, a driver of a target platform is written into the original virtual machine, and the original virtual machine is exported as the original image file in a file format of an original platform. Then, a software engineer converts the file format of the original image file into a target file format by using an image file format conversion tool, uses the original image file in the target file format to create a virtual machine on the target platform, and installs the target driver that has been written into the virtual machine, so as to obtain a target virtual machine on the target platform. Further, the target virtual machine is exported as a target image file, and the target image file is used to create target virtual machines in batches on the target platform.

When an original image file is converted into a target image file, the original image file needs to be started as a virtual machine. Therefore, resource consumption is relatively high, and conversion efficiency is relatively low.

SUMMARY

To resolve problems of relatively high resource consumption and relatively low image file conversion efficiency that are caused by that an original image file needs to be started as a virtual machine when the original image file is converted, embodiments of the present invention provide an image file conversion method and apparatus. The technical solutions are as follows:

According to a first aspect, an image file conversion method is provided, where the method includes: obtaining an original image file of a virtual machine on an original platform; detecting whether the original image file has a first file characteristic and a second file characteristic that are corresponding to a target platform, where the first file characteristic includes a target driver used when the virtual machine runs on the target platform, and the second file characteristic includes a target file format supported by the target platform; and changing, when the original image file does not have at least one of the first file characteristic or the second file characteristic, the original image file by calling a predetermined interface, to obtain a target image file of the virtual machine on the target platform, where the target image file has the first file characteristic and the second file characteristic.

In this implementation, when a conversion server detects that the original image file does not have at least one file characteristic corresponding to the target platform, it indicates that the original image file cannot be directly used on the target platform. In this case, the conversion server directly changes the original image file by calling the predetermined interface, without starting the original image file as a virtual machine before the change, and then, can obtain the target image file of the virtual machine on the target platform by means of conversion, so that the virtual machine runs normally on the target platform. Therefore, resources are saved and image file conversion efficiency is improved.

In a first possible implementation of the first aspect, the changing, when the original image file does not have at least one of the first file characteristic or the second file characteristic, the original image file by calling a predetermined interface includes: when the original image file does not have the first file characteristic, replacing an original driver in the original image file with the target driver by calling a first predetermined interface.

With reference to the first possible implementation of the first aspect, in a second possible implementation of the first aspect, the replacing an original driver in the original image file with the target driver by calling a first predetermined interface includes: determining a driver directory in the original image file according to an operating system type of an operating system in the original image file, where the driver directory is a default directory in which a driver of an operating system of the operating system type is located; and replacing the original driver in the driver directory with the target driver by calling the first predetermined interface.

In this optional implementation, when detecting that the original driver in the original image file is not the target driver used when the virtual machine runs on the target platform, the conversion server automatically changes the original driver in the original image file according to the target driver, without a need to manually change the original driver by a specialized engineer, so that image file conversion efficiency is improved, and a chance of an error caused in a manual operation process is also reduced.

With reference to any one of the first aspect, the first possible implementation of the first aspect, or the second possible implementation of the first aspect, in a third possible implementation of the first aspect, the detecting whether the original image file has a first file characteristic corresponding to a target platform includes: accessing the original image file by calling the first predetermined interface, to determine the operating system type of the operating system in the original image file; determining the target driver corresponding to both the operating system type and the target platform; detecting whether the original driver is the same as the target driver; and when the original driver is different from the target driver, determining that the original image file does not have the first file characteristic.

In this optional implementation, the conversion server automatically recognizes the operating system type of the operating system in the original image file, without a need to manually enter the operating system type by a user, so that an image file conversion error caused when the user manually enters an erroneous operating system type is avoided.

With reference to the first aspect, in a fourth possible implementation of the first aspect, the changing, when the original image file does not have at least one of the first file characteristic or the second file characteristic, the original image file by calling a predetermined interface includes: when the original image file does not have the second file characteristic, changing an original file format of the original image file to the target file format by calling a second predetermined interface.

In this optional implementation, when detecting that the original file format of the original image file is not the target file format supported by the target platform, the conversion server automatically changes the original file format of the original image file according to the target file format, without a need to manually change the original file format by a specialized engineer, so that image file conversion efficiency is improved, and a chance of an error caused in a manual operation process is also reduced.

With reference to the fourth possible implementation of the first aspect, in a fifth possible implementation of the first aspect, the detecting whether the original image file has a second file characteristic corresponding to a target platform includes: determining the target file format supported by the target platform; detecting whether the original file format is the same as the target file format; and when the original file format is different from the target file format, determining that the original image file does not have the second file characteristic.

With reference to the first aspect, in a sixth possible implementation of the first aspect, the obtaining an original image file of a virtual machine on an original platform includes: obtaining the original image file from an image repository, where the image repository is configured to store an image file uploaded by a user.

According to a second aspect, an image file conversion apparatus is provided, where the apparatus includes at least one unit, and the at least one unit in the apparatus is configured to implement the image file conversion method provided in the first aspect.

According to a third aspect, a conversion server is provided, where the conversion server includes a processor and a memory connected to the processor. The memory is configured to store one or more instructions, the instructions are indicated to be executed by the processor, and the processor is configured to implement the image file conversion method provided in the first aspect.

BRIEF DESCRIPTION OF DRAWINGS

FIG. 3 is a flowchart of an image file conversion method according to an example embodiment of the present invention;

FIG. 4A and FIG. 4B are a flowchart of an image file conversion method according to another example embodiment of the present invention;

DESCRIPTION OF EMBODIMENTS

To make the objectives, technical solutions, and advantages of this disclosure clearer, the following further describes the implementations of this disclosure in detail with reference to the accompanying drawings.

"Multiple" mentioned in this specification means two or more. The term "and/or" describes an association relationship of associated objects and represents that three relationships may exist. For example, A and/or B may represent the following three cases: Only A exists, both A and B exist, and only B exists. The character "/" generally indicates an "or" relationship between the associated objects.

Figure 1:
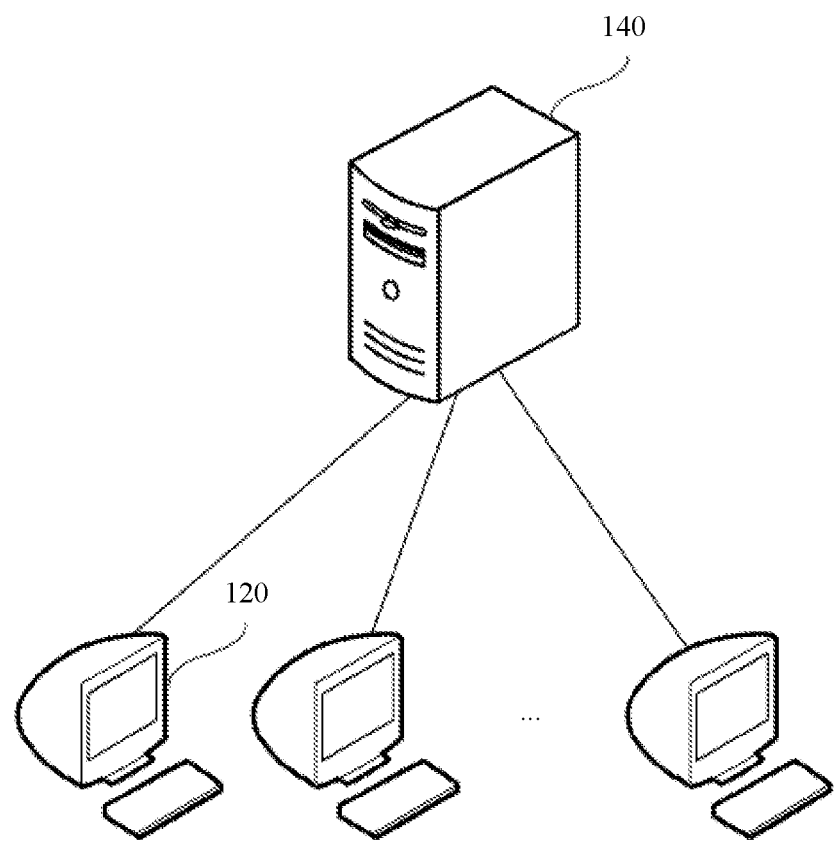
FIG. 1 is a schematic structural diagram of an image file conversion system according to an example embodiment of the present invention.

Referring to FIG. 1, FIG. 1 shows a schematic structural diagram of an image file conversion system according to an example embodiment of the present invention. The system includes a terminal device 120 and a conversion server 140.

The terminal device 120 is an electronic device such as a mobile phone, a tablet computer, an electronic book reader, an MP3 (Moving Picture Experts Group Audio Layer III, Moving Picture Experts Group Audio Layer III) player, an MP4 (Moving Picture Experts Group Audio Layer IV, Moving Picture Experts Group Audio Layer IV) player, a desktop computer, or a portable computer.

The terminal device 120 establishes a communication connection to the conversion server 140 in a wireless network manner or a wired network manner.

The terminal device 120 is configured to send an image file conversion request to the conversion server 140, to request the conversion server 140 to convert an image file. The conversion server 140 is configured to: perform a conversion operation on the image file according to the image file conversion request, and return a converted image file to the terminal device 120. The conversion server 140 is a server, a server cluster including several servers, or a cloud computing service center. During actual implementation, the conversion server 140 is a physical machine, a virtual machine, a physical machine cluster, or a virtual machine cluster.

Figure 2:
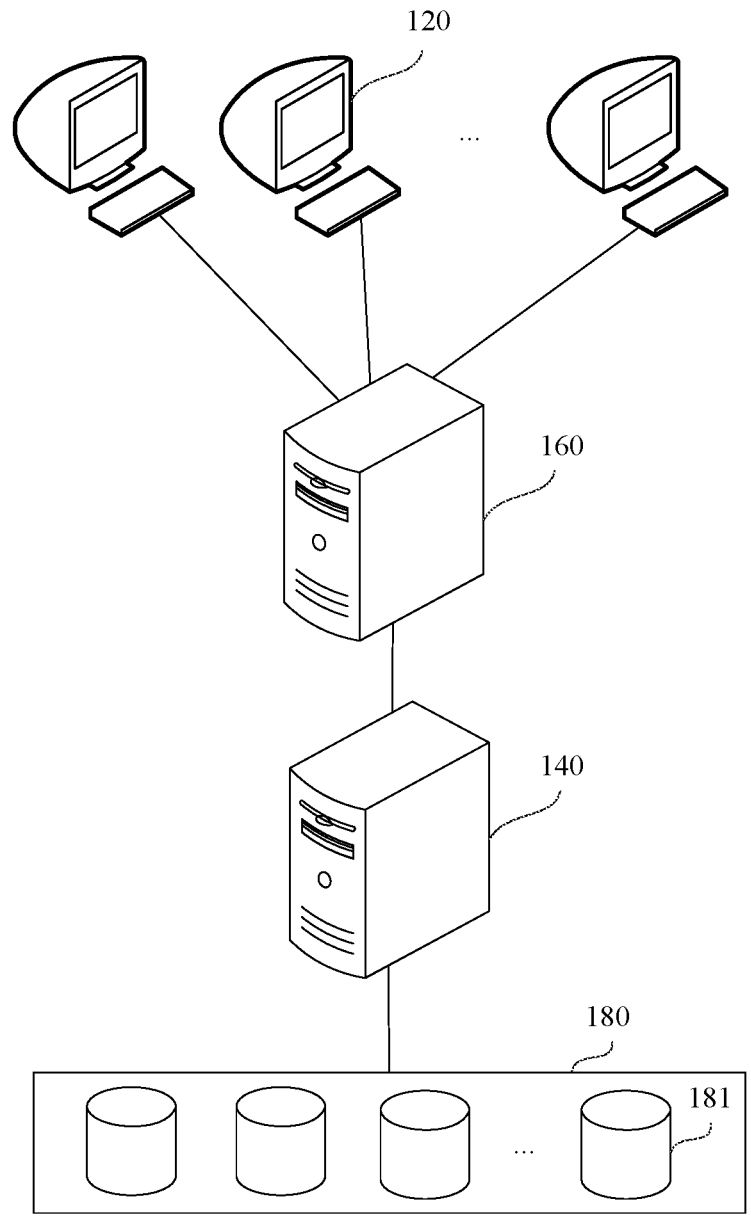
FIG. 2 is a schematic structural diagram of an image file conversion system according to another example embodiment of the present invention.

A relatively long time is required by the conversion server 140 to convert the image file. To better respond to the request of the terminal device 120, optionally, the system further includes a communications server 160, as shown in FIG. 2.

The communications server 160 is configured to: receive the image file conversion request of the terminal device 120, and forward the image file conversion request to the conversion server 140. The communications server 160 is a server, a server cluster including several servers, or a cloud computing service center. During actual implementation, the communications server 160 is a physical machine, a virtual machine, a physical machine cluster, or a virtual machine cluster. The communications server 160 establishes a communication connection to the conversion server 140 in a wireless network manner or a wired network manner.

During actual implementation, generally, the image file that the terminal device 120 requests the conversion server 140 to convert is not sent to the conversion server 140 in real time. Optionally, the system further includes an image repository 180, as shown in FIG. 2. The image repository 180 is configured to store an image file uploaded by a user. When the conversion server 140 needs to convert an image file, the conversion server 140 directly obtains the image file from the image repository 180, and the conversion server 140 returns a converted image file to the terminal device 120 or the image repository 180.

A size of an image file is generally relatively large. Optionally, the image repository 180 is a device having a relatively strong storage capability and relatively high storage reliability. Optionally, the image repository 180 is a storage device based on an object storage service (Object Storage Service). Optionally, the image repository 180 is an object storage system (Object Storage System), and the image repository 180 establishes a communication connection to the conversion server 140 in a wired network manner or a wireless network manner. The image repository 180 includes a large quantity of storage units configured to store data. In the object storage system, the storage unit is an object (Object) 181, and the object 181 is configured to store an image file.

Optionally, the image repository 180 may be implemented as a storage device that is based on file storage. Optionally, the image repository 180 is a network attached storage (Network Attached Storage, NAS), and the image repository 180 is connected to the conversion server 140 over the Ethernet. A storage unit in the NAS is a storage medium such as a magnetic disk or a magnetic disk array.

Optionally, the image repository 180 may be implemented as a local storage of the conversion server 140, and the image repository 180 is connected to the conversion server 140 by using an input/output (I/O) interface. A storage unit in the local storage is a storage medium such as a magnetic disk or a magnetic disk array.

Optionally, the image repository 180 may be implemented as a storage area network (Storage Area Network, SAN) specific to storage of a shared block, and the image repository 180 is connected to the conversion server 140 by using the Fibre Channel (Fibre Channel, FC). A storage unit in the SAN is a storage medium such as a magnetic disk or a magnetic disk array.

Referring to FIG. 3, FIG. 3 shows a flowchart of an image file conversion method according to an example embodiment of this disclosure. In this embodiment, an example in which the method is applied to the conversion server shown in FIG. 1 or FIG. 2 is used for description. The method includes the following steps.

Step 301: The conversion server obtains an original image file of a virtual machine on an original platform.

The virtual machine is a virtual computer system that is obtained by means of software simulation and that has a complete hardware system function. The virtual machine runs on a platform. The platform is a computer system used for providing a running environment and running resources for the virtual machine. The running resources provided by the platform for the virtual machine include an instance, a memory, and the like. Optionally, the platform includes at least one of a data center or a cloud platform. The cloud platform includes at least one of a public cloud platform or a private cloud platform. For example, the virtual machine runs on a Hadoop cloud platform.

Image files of the virtual machine include an operating system of the virtual machine, various application programs, and configuration information that is required when the virtual machine runs. In this embodiment of the present invention, the configuration information includes a driver used when the virtual machine runs on the platform, and configuration information in the original image file includes a driver used when the virtual machine runs on the original platform.

Step 302: The conversion server detects whether the original image file has a first file characteristic and a second file characteristic that are corresponding to a target platform.

The first file characteristic includes a target driver used when the virtual machine runs on the target platform, and the second file characteristic includes a target file format supported by the target platform.

Step 303: When the original image file does not have at least one of the first file characteristic or the second file characteristic, the conversion server changes the original image file by calling a predetermined interface, to obtain a target image file of the virtual machine on the target platform, where the target image file has the first file characteristic and the second file characteristic.

The original platform and the target platform are different cloud platforms. Specifically, drivers used when a same virtual machine runs on the original platform and the target platform are different, and/or file formats supported by the original platform and the target platform are different. In the embodiments of the present invention, the original platform is a conventional data center, and the target platform is a cloud platform like a public cloud platform and a private cloud platform. Alternatively, the original platform and the target platform are different cloud platforms. That the original platform and the target platform are different cloud platforms includes: The original platform and the target platform are of different cloud platform types. For example, the original platform is a private cloud platform, and the target platform is a public cloud platform. Alternatively, the original platform and the target platform are a same type of cloud platforms developed by different developers. For example, the original platform is a public cloud platform developed by a developer A, and the target platform is a public cloud platform developed by a developer B.

In conclusion, according to the image file conversion method provided in this embodiment of the present invention, when the conversion server detects that the original image file does not have at least one file characteristic corresponding to the target platform, it indicates that the original image file cannot be directly used on the target platform. In this case, the conversion server directly changes the original image file by calling the predetermined interface, without starting the original image file as a virtual machine before the change, and then, can obtain the target image file of the virtual machine on the target platform by means of conversion, so that the virtual machine runs normally on the target platform. Therefore, resources are saved and image file conversion efficiency is improved.

Figure 4B:
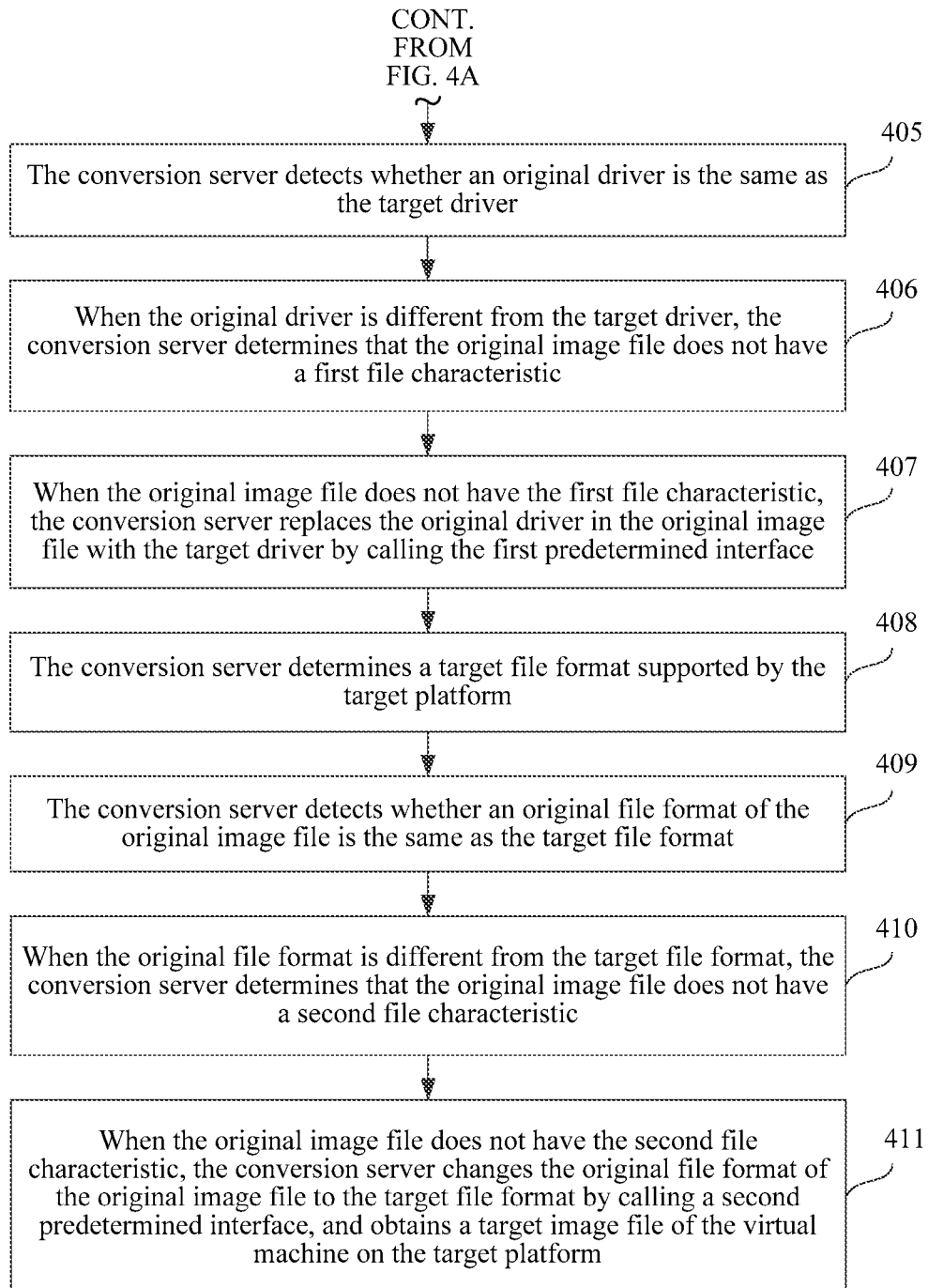

Referring to FIG. 4A and FIG. 4B, FIG. 4A and FIG. 4B show a flowchart of an image file conversion method according to an example embodiment of this disclosure. In this embodiment, an example in which the method is applied to the conversion server shown in FIG. 1 or FIG. 2 and an original image file has neither a first file characteristic nor a second file characteristic is used for description. The method includes the following steps.

Step 401: The conversion server receives an image file conversion request sent by a terminal device.

Optionally, the conversion server directly receives the image file conversion request sent by the terminal device, as shown in FIG. 1. Alternatively, the conversion server receives the image file conversion request forwarded by a communications server, as shown in FIG. 2.

Step 402: The conversion server obtains an original image file of a virtual machine on an original platform according to the image file conversion request.

When the method is applied to the system shown in FIG. 1 or FIG. 2, optionally, the image file conversion request includes the original image file, and the conversion server obtains the original image file in the image file conversion request.

When the method is applied to the system shown in FIG. 2, optionally, the image file conversion request includes a file identifier of the original image file, and the conversion server obtains the original image file from an image repository according to the file identifier.

Optionally, the file identifier is a filename of the original image file, and a correspondence between a filename and an image file is stored in the image repository. During actual implementation, filenames of image files may be the same. Therefore, optionally, the file identifier may further include a user identifier corresponding to the original image file. The user identifier is a user identifier of a user who stores the original image file in the image repository, and a correspondence between a filename, a user identifier, and an image file is stored in the image repository. Optionally, the user identifier is a user account.

During actual implementation, after logging in to the user account on the terminal device, the user stores the original image file in the image repository by using the terminal device. In this case, the image repository stores a correspondence between the original image file and both the user account and the filename of the original image file. When the user requests to convert the original image file, the user logs in to the user account, and sends the image file conversion request to the conversion server. The image file conversion request carries the user account to which the user logs in, and the filename of the original image file that the user requests to convert.

For example, the user logs in to a user account A on the terminal device, and pre-stores an original image file M with a filename B in the image repository by using the terminal device. In this case, the image repository stores a correspondence between the original image file M and both the user account A and the filename B. When the user logs in to the user account A and requests to convert the image file with the filename B, an image file conversion request received by the conversion server includes the user account A and the filename B, and the conversion server obtains the original image file M from the image repository.

Step 403: The conversion server accesses the original image file by calling a first predetermined interface, to determine an operating system type of an operating system in the original image file.

Optionally, the operating system type in this embodiment of the present invention is used to indicate an operating system series to which the operating system belongs. For example, the operating system type is Windows. Optionally, operating system types corresponding to different system versions of operating systems in a same operating system series are the same. For example, operating system types corresponding to the operating system Windows 7 and the operating system Window 10 are both Windows.

Optionally, the operating system type in this embodiment of the present invention is used to indicate an operating system series and a system version to which the operating system belongs. For example, the operating system type is Linux SUSE. Optionally, different system versions of operating systems in a same operating system series have corresponding operating system types. Different system versions of operating systems are corresponding to different operating system types. For example, an operating system type corresponding to the operating system Linux SUSE is Linux SUSE, and an operating system type corresponding to the operating system Linux Ubuntu is Linux Ubuntu. The two operating system types are different.

In this embodiment of the present invention, an example in which the operating system type is used to indicate the operating system series to which the operating system belongs is used for description.

Generally, operating system information of a same type of operating systems is stored in a same default directory, and default directories used to store operating system information are different in different types of operating systems.

For example, in an operating system in the Linux series, operating system information is stored in /etc/release. In an operating system in the Windows series, operating system information is stored in a registry HKEY_LOCAL_MACHINE\SOFTWARE\Microsoft\ Windows NT\CurrentVersion of the Windows system, and the operating system in the Windows series does not include the directory /etc/release.

Without starting the image file as a virtual machine, the conversion server directly accesses content in the original image file by calling the first predetermined interface, to determine the operating system type. Optionally, a tool set libguestfs is installed on the conversion server, and the first predetermined interface includes an interface corresponding to a tool included in the tool set libguestfs. The tool set libguestfs is a group of application programming interfaces (Application Programming Interface, API). The tool set includes tools such as virt-cat, virt-df, virt-ls, virt-copy-in, virt-copy-out, virt-edit, guestfs, guestmount, virt-list-filesystems, and virt-list-partitions. Optionally, the first predetermined interface further includes an interface corresponding to a tool chntpw, and the tool chntpw is used to change a system password of an operating system in the Windows series, so that a registry of the operating system can be read.

During actual implementation, before determining the operating system type, the conversion server first mounts the original image file onto the conversion server by calling an interface corresponding to the tool guestmount, so that the conversion server accesses and processes the original image file.

Optionally, the conversion server stores a correspondence between an operating system type and an operating system directory. The operating system directory is a default directory used to store operating system information. There are the following two implementations for accessing, by the conversion server, the original image file by calling the first predetermined interface, to determine the operating system type.

In a first possible implementation, the conversion server scans directories in the original image file by calling the first predetermined interface. When learning, by means of scanning, that the original image file includes an operating system directory corresponding to an operating system type, the conversion server determines that the operating system type is an operating system type corresponding to the operating system directory.

For example, the conversion server stores a correspondence between the operating system type Linux and the operating system directory /etc/release, and stores a correspondence between the operating system type Windows and the operating system directory HKEY_LOCAL_MACHINE\SOFTWARE\Microsoft\ Windows NT\CurrentVersion. When learning, by means of scanning by calling the first predetermined interface, that the original image file includes /etc/release, the conversion server determines that the operating system type of the operating system in the original image file is Linux. In this example, the first predetermined interface is an interface corresponding to the tool guestfs. When learning, by means of scanning by calling the first predetermined interface, that the original image file includes HKEY_LOCAL_MACHINE\SOFTWARE\Microsoft\ Windows NT\CurrentVersion, the conversion server determines that the operating system type of the operating system in the original image file is Windows. In this example, the first predetermined interface is the interface corresponding to the tool chntpw.

In a second implementation, the conversion server scans directories in the original image file by calling the first predetermined interface. When learning, by means of scanning, that the original image file includes an operating system directory corresponding to an operating system type, the conversion server reads operating system information stored in the operating system directory, and determines an operating system type included in the operating system information. The operating system information further includes a version number of the operating system, an operating system bit count, and the like. This is not further described in this embodiment.

For example, in the foregoing example, when learning, by means of scanning, that the original image file includes /etc/release, the conversion server reads operating system information in the directory. The operating system information includes the operating system type Linux.

Step 404: The conversion server determines a target driver corresponding to both the operating system type and a target platform.

Optionally, when operating system types of operating systems separately used by at least two virtual machines running on a same target platform are different, target drivers used when the at least two virtual machines run on the target platform are different. Target drivers used when at least two virtual machines using a same operating system type run on different target platforms are also different.

In a possible implementation, the conversion server receives a target platform identifier sent by the terminal device, or the image file conversion request received by the conversion server includes a target platform identifier. The target platform identifier is used to uniquely identify the target platform among platforms.

In this implementation, the conversion server stores a correspondence between the operating system type, the target platform identifier, and the target driver. After recognizing the operating system type and determining the target platform identifier in the image file conversion request, the conversion server queries for the target driver corresponding to both the target platform and the operating system type.

For example, when the operating system type is used to indicate the operating system series to which the operating system belongs, the correspondence, stored in the conversion server, between the operating system type, the target platform identifier, and the target driver is shown in Table 1:

TABLE 1

| Operating system type | Target platform identifier | Target driver |
|---|---|---|
| Linux | Platform identifier 1 | Driver 1 |
| Windows | Platform identifier 1 | Driver 2 |
| Linux | Platform identifier 2 | Driver 3 |

In this example, when determining that the operating system type in the original image file is Linux and the target platform identifier is a platform identifier 1, the conversion server determines that the target driver is a driver 1. Content and a form shown in Table 1 are examples. In an actual embodiment, for one group including one operating system type and one target platform identifier, there are generally multiple target drivers, and each target driver is corresponding to one or one type of hardware device.

For another example, when the operating system type is used to indicate the operating system series and the system version to which the operating system belongs, the correspondence, stored in the conversion server, between the operating system type, the target platform identifier, and the target driver may be shown in Table 2:

TABLE 2

| Operating system type | Target platform identifier | Target driver |
|---|---|---|
| Linux SUSE | Platform identifier 1 | Driver 1 |
| Windows | Platform identifier 1 | Driver 2 |
| Linux Ubuntu | Platform identifier 1 | Driver 3 |

In this example, when the conversion server determines that the operating system type in the original image file is Linux SUSE and the target platform identifier is a platform identifier 1, the conversion server determines that the target driver is a driver 1. Content and a form shown in Table 2 are examples.

In another possible implementation, the conversion server is a conversion server corresponding to a default target platform, and the conversion server is configured to convert the original image file into an image file on the default target platform. In this implementation, the target platform is determined. Therefore, the conversion server stores a correspondence between the operating system type and the target driver, and the conversion server determines, by means of querying, the target driver corresponding to the obtained operating system type.

Step 405: The conversion server detects whether an original driver is the same as the target driver.

Generally, drivers of different types of operating systems are stored in different driver directories, and drivers of a same type of operating systems are stored in a same driver directory. The driver directory is a default directory in which a driver of an operating system of the operating system type is located. For example, in an operating system in the Linux series, a driver directory used to store a driver is /opt/pvdriver. In an operating system in the Windows series, a driver directory used to store a driver is C:\Program Files.

The conversion server stores the correspondence between the operating system type and the driver directory. Optionally, the conversion server determines the driver directory in the original image file according to the operating system type of the operating system in the original image file. After determining the operating system type of the operating system that is included in the original image file, the conversion server queries for the correspondence to determine the driver directory corresponding to the operating system type. A file, in the original image file, stored in the driver directory is the original driver, and the conversion server detects whether the obtained original driver is the same as the determined target driver. For example, when determining that the operating system type is the Windows type, the conversion server determines that the driver directory is C:\Program Files, and obtains the file, that is, the original driver, in the driver directory.

Step 406: When the original driver is different from the target driver, the conversion server determines that the original image file does not have a first file characteristic.

Step 407: When the original image file does not have the first file characteristic, the conversion server replaces the original driver in the original image file with the target driver by calling the first predetermined interface.

Figure 5:
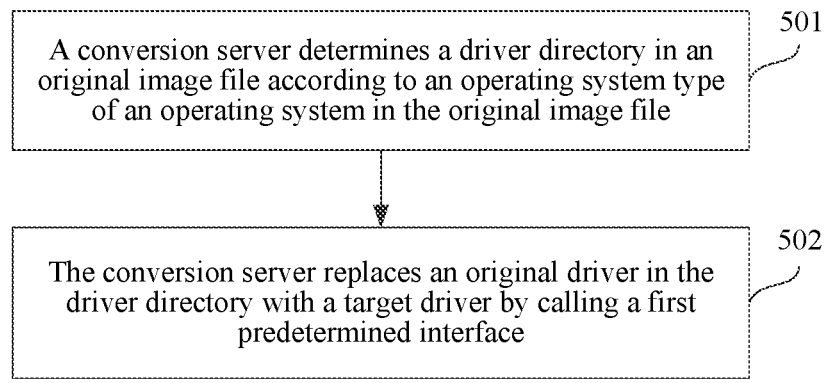
FIG. 5 is a flowchart of an image file conversion method according to another example embodiment of the present invention.

Step 407 includes the following several steps, as shown in FIG. 5.

Step 501: The conversion server determines a driver directory in the original image file according to the operating system type of the operating system in the original image file.

During actual implementation, in step 405, when detecting whether the original driver is the same as the target driver, the conversion server also needs to determine the driver directory in the original image file. In this case, this step is the same as a step of determining the driver directory in step 405.

Step 502: The conversion server replaces the original driver in the driver directory with the target driver by calling the first predetermined interface.

Specifically, the conversion server deletes the original driver in the driver directory by calling the first predetermined interface, and writes the target driver into the driver directory. A meaning of the first predetermined interface is the same as that in step 403. This is not described again in this embodiment.

During actual implementation, optionally, the conversion server further performs an operation such as a read operation and/or a delete operation on another file in the original image file by calling the first predetermined interface. This is not limited in this embodiment.

In addition, in another optional implementation, if the original image file includes an index file, optionally, the conversion server changes the original driver according to the index file instead of determining the driver directory to change the original driver. The index file includes an offset of each file in the original image file and a quantity of bytes occupied by the file. The offset refers to a location of a start byte location of the file in the entire original image file. For example, the index file includes an offset 1000 of the original driver and a quantity 2000 of occupied bytes. It indicates that the original driver starts at a location of the 1000th byte in the original image file, and occupies 2000 bytes. That is, a file between the $1000^{th}$ byte and the $2999^{th}$ byte in the original image file is the original driver. The conversion server deletes the file between the $1000^{th}$ byte and the $2999^{th}$ byte according to the index file, and then, writes the target driver into the location of the bytes between the $1000^{th}$ byte and the $2999^{th}$ byte, so that the original driver is replaced with the target driver.

When the original driver is the same as the target driver, the conversion server determines that the original image file has the first file characteristic. In this case, in a possible implementation, the conversion server directly performs the following step 408. This is not limited in this embodiment of the present invention.

Step 408: The conversion server determines a target file format supported by the target platform.

Generally, different platforms support different file formats. Common file formats of image files are a raw (Raw image) format, a QCOW (QEMU (Quick Emulator) Copy-On-Write) format, a QCOW2 format, and a VMDK (Virtual machine Disk) format.

In a possible implementation, the conversion server is configured to convert an image file into image files on multiple different platforms. Optionally, the conversion server stores a correspondence between a target platform identifier and a target file format. For example, a target platform identified by a target platform identifier A supports the raw format, and a target platform identified by a target platform identifier B supports the QCOW2 format. The conversion server queries for the correspondence between the target platform identifier and the target file format to determine the target file format corresponding to the received target platform identifier.

In another possible implementation, the conversion server is a conversion server corresponding to a default platform. Generally, the target file format is predetermined, that is, the target file format is a file format supported by the default platform. The conversion server directly determines the predetermined target file format.

Step 409: The conversion server detects whether an original file format of the original image file is the same as the target file format.

Step 410: When the original file format is different from the target file format, the conversion server determines that the original image file does not have a second file characteristic.

Step 411: When the original image file does not have the second file characteristic, the conversion server changes the original file format of the original image file to the target file format by calling a second predetermined interface, and obtains a target image file of the virtual machine on the target platform.

Optionally, a command line tool QEMU-IMG is installed on the conversion server, and the second predetermined interface is an interface corresponding to the command line tool QEMU-IMG The command line tool QEMU-IMG is a magnetic disk management tool of a quick emulator (QEMU), and the conversion server changes the original file format of the original image file to the target file format by using a convert command in the command line tool QEMU-IMG. Optionally, the second predetermined interface may be an interface corresponding to a tool Image Copy. In this embodiment of the present invention, an example in which the second predetermined interface is the interface corresponding to the command line tool QEMU-IMG is merely used for description.

A command line commonly used when the conversion server changes the original file format by calling the second predetermined interface is convert[-c] [-f fmt] [-O output_fmt] [-o options] filename [filename2[ . . . ]] output-_filename. The command line indicates changing an image file of which an original file format is a format fmt to an image file of which a target image format is a format output_fmt. The -c command in the command line indicates compressing the changed image file in the target file format. The parameter filename indicates a filename of the image file in the original file format. The parameter output_filename indicates a filename of the image file in the target file format. The parameter options indicates another parameter used when the original file format is changed. This is not further described in this embodiment.

When the original file format is the same as the target file format, in a possible implementation, the conversion server directly determines that the original image file including the target driver is the target image file of the virtual machine on the target platform. This is not limited in this embodiment of the present invention.

It should be noted that, when the original image file has neither the first file characteristic nor the second file characteristic, that is, when the conversion server needs to change the original driver in the original image file and the original file format of the original image file, to avoid a fact that the driver directory in the original image file cannot be correctly found after the original file format of the original image file is changed, during actual implementation, the conversion server usually first changes the original driver, and then, changes the original file format.

During actual implementation, in addition to changing the original driver in the original image file and/or the original file format, the conversion server changes system configuration information in the original image file, for example, changes a registry startup item. Generally, system configuration information required when virtual machines having a same type of operating systems run on a same platform is the same. The conversion server stores a correspondence between an operating system type, a target platform identifier, and system configuration information. The conversion server queries for target system configuration information corresponding to both the operating system type and the target platform identifier, and changes the system configuration information to be the same as the target system configuration information.

Figure 6:
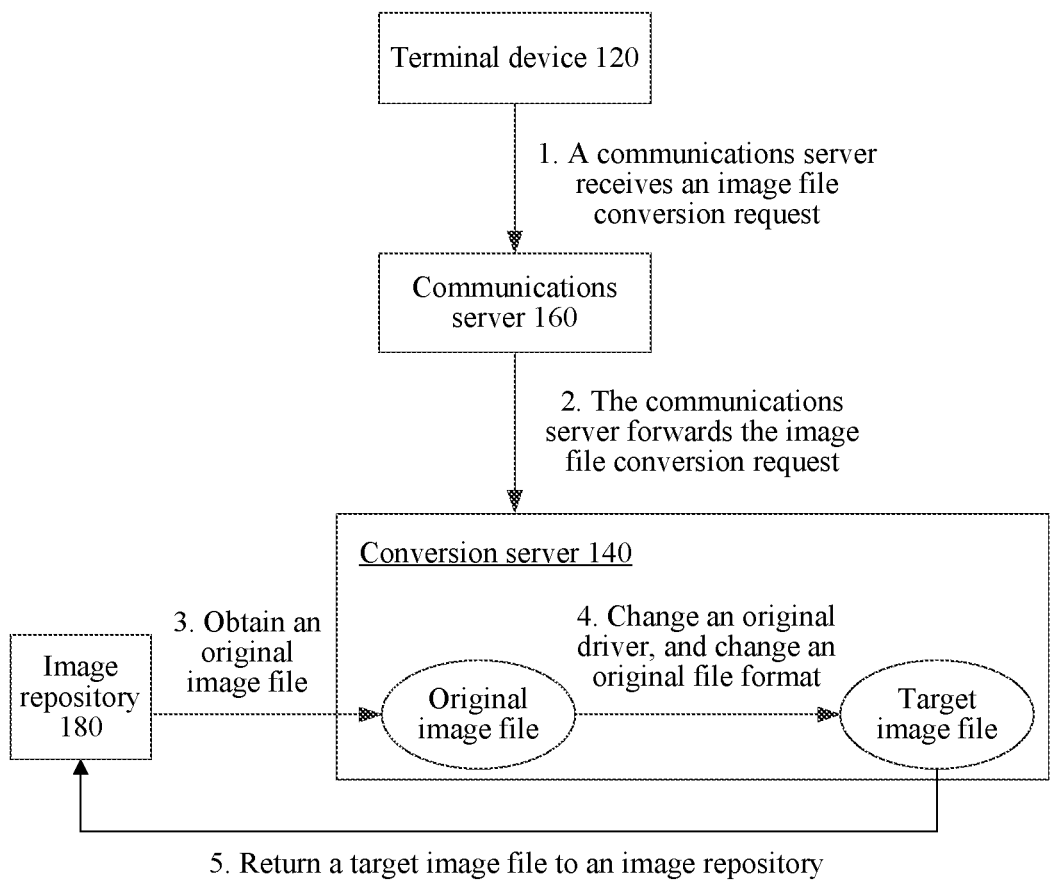
FIG. 6 is a flowchart of an image file conversion method according to another example embodiment of the present invention.

The system shown in FIG. 2 is used as an example, and a schematic communication diagram of the image file conversion method provided in this embodiment is shown in FIG. 6.

In conclusion, according to the image file conversion method provided in this embodiment of the present invention, when the conversion server detects that the original image file does not have at least one file characteristic corresponding to the target platform, it indicates that the original image file cannot be directly used on the target platform. In this case, the conversion server directly changes the original image file by calling the predetermined interface, without starting the original image file as a virtual machine before the change, and then, can obtain the target image file of the virtual machine on the target platform by means of conversion, so that the virtual machine runs normally on the target platform. Therefore, resources are saved and image file conversion efficiency is improved.

According to the image file conversion method provided in this embodiment of the present invention, the conversion server determines the file characteristics corresponding to the target platform, and automatically changes the driver in the original image file according to the target driver used for the target platform, and/or automatically changes the original file format of the original image file according to the target file format supported by the target platform, without a need to manually change the original driver and the original file format by a specialized engineer, so that image file conversion efficiency is improved, and a chance of an error caused in a manual operation process is also reduced.

According to the image file conversion method provided in this embodiment of the present invention, the conversion server automatically recognizes the operating system type of the operating system in the original image file, without a need to manually enter the operating system type by a user, so that an image file conversion error caused when the user manually enters an erroneous operating system type is avoided.

Optionally, after obtaining the target image file by using the image file conversion method provided in any embodiment of FIG. 4A and FIG. 4B and FIG. 5, the conversion server returns the target image file to the terminal device, or returns the original image file to the image repository.

In a first possible implementation, the conversion server obtains the original image file in the image file conversion request sent by the terminal device. Optionally, after receiving the original image file sent by the terminal device, the conversion server further temporarily stores a correspondence between a device identifier of the terminal device and the original image file. After obtaining the target image file by means of conversion, the conversion server returns the target image file to the terminal device according to the device identifier. Optionally, the device identifier includes at least one of an international mobile equipment identity (International Mobile Equipment Identity, IMEI), a Media Access Control (Media Access Control, MAC) address, an Internet Protocol (Internet Protocol, IP) address, or an international mobile subscriber identity (International Mobile Subscriber Identity, IMSI) of the terminal device.

In a second possible implementation, the conversion server obtains the original image file from the image repository according to the file identifier in the image file conversion request. Optionally, after the conversion server obtains the original image file from the image repository according to the file identifier, and converts the original image file into the target image file, the conversion server sends the file identifier and the target image file to the image repository, and replaces, with the target image file, the original image file that is corresponding to the file identifier and that is stored in the image repository. Alternatively, the conversion server generates a new file identifier corresponding to the target image file, sends a correspondence between the new file identifier and the target image file to the image repository, and stores the correspondence between the new file identifier and the target image file in the image repository. During actual implementation, a new filename included in the new file identifier is different from the filename of the original image file. However, generally, a user identifier included in the new file identifier is the same as the user identifier in the file identifier corresponding to the original image file. In this possible implementation, optionally, the conversion server further directly returns the target image file to the terminal device that sends the image file conversion request. For an implementation thereof, refer to the first possible implementation. This is not described again in this embodiment.

Figure 7:
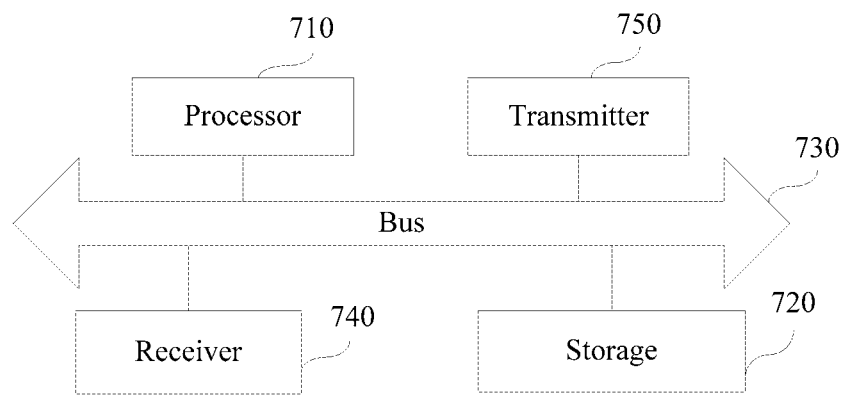
FIG. 7 is a schematic structural diagram of a conversion server according to an example embodiment of the present invention.

Referring to FIG. 7, FIG. 7 shows a schematic structural diagram of a conversion server according to an example embodiment of the present invention. The conversion server includes a processor 710, a memory 720, and a bus 730.

The processor 710 includes one or more processing cores, and the processor 710 executes various functional applications and performs information processing by running software programs and modules.

The memory 720 is connected to the processor 710 by using the bus 730. The memory 720 is configured to store an instruction. The processor 710 implements the foregoing image file conversion method by executing the instruction stored in the memory 720.

In addition, the memory 720 is implemented by using any type of volatile storage device, any type of non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optic disc.

Optionally, the conversion server further includes a receiver 740 and a transmitter 750. Both the receiver 740 and the transmitter 750 are connected to the processor 710. The receiver 740 and the transmitter 750 are implemented as communications components. Optionally, the communications component includes a network port. The conversion server establishes a communication connection to a terminal device, a communications server, and another device in a wired network manner by using the network port. Optionally, the conversion server includes at least two network ports. Optionally, the communications component includes a communications chip. The communications chip includes a receiving module, a transmission module, a modem module, and the like, and is configured to modulate or demodulate information and receive or send information by using a wireless signal. The conversion server establishes a communication connection to the terminal device in a wireless network manner by using the communications chip.

Figure 8:
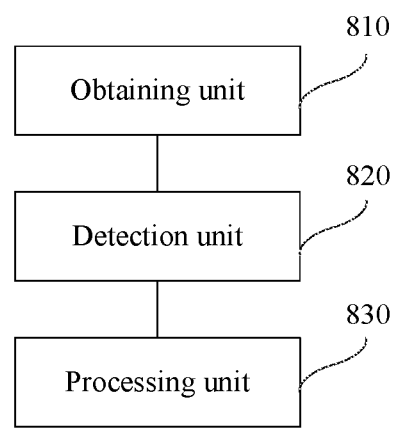
FIG. 8 is a block diagram of an image file conversion apparatus according to an example embodiment of the present invention.

Referring to FIG. 8, FIG. 8 shows a block diagram of an image file conversion apparatus according to an embodiment of the present invention. The image file conversion apparatus is implemented as all or a part of a conversion server by using software, hardware, or a combination thereof. The image file conversion apparatus includes:

an obtaining unit 810, configured to perform step 301, step 401, and step 402;

a detection unit 820, configured to perform step 302, step 403, step 404, step 405, step 406, step 408, step 409, and step 410; and a processing unit 830, configured to perform step 303, step 407, step 501, step 502, and step 411.

During actual implementation, the image file conversion apparatus shown in FIG. 8 is configured to implement the foregoing image file conversion methods provided in the embodiments. For the image file conversion apparatus, the obtaining unit 810 may obtain information, the detection unit 820 may perform a detection operation, and the processing unit 830 may perform a processing operation.

It should be understood that, "and/or" used in this specification means to include any or all possible combinations of one or more associated listed items.

A person of ordinary skill in the art may understand that all or some of the steps of the embodiments may be implemented by hardware or a program instructing related hardware. The program may be stored in a computer-readable storage medium. The mentioned storage medium may include a read-only memory, a magnetic disk, or an optical disc.

The foregoing descriptions are merely example embodiments of this disclosure, but are not intended to limit this disclosure. Any modification, equivalent replacement, or improvement made without departing from the spirit and principle of this disclosure shall fall within the protection scope of this disclosure.

What is claimed is:

1. An image file conversion method, wherein the method comprises:

obtaining an original image file of a virtual machine on an original platform;

detecting, automatically without user input, that the original image file does not have at least a first file characteristic of first and second file characteristics that are corresponding to a target platform, wherein the first file characteristic comprises a target driver used when the virtual machine runs on the target platform, and the second file characteristic comprises a target file format supported by the target platform; and directly changing the original image file, in response to the detecting that the original image file does not have at least the first file characteristic, by calling a predetermined interface without starting the original image file as a virtual machine before the change, to obtain a target image file of the virtual machine on the target platform, wherein the target image file has the first file characteristic and the second file characteristic, wherein directly changing the original image file by calling the predetermined interface comprises:

in response to detecting that the original image file does not have the first file characteristic, replacing an original driver in the original image file with the target driver by calling a first predetermined interface, wherein replacing the original drive includes:

deleting the original driver in a driver directory by calling the first predetermined interface; and writing the target driver into the driver directory.

2. The method according to claim 1, wherein the replacing the original driver in the original image file with the target driver comprises:

determining a driver directory in the original image file according to an operating system type of an operating system in the original image file, wherein the driver directory is a default directory in which a driver of an operating system of the operating system type is located; and replacing the original driver in the driver directory with the target driver by calling the first predetermined interface.

3. The method according to claim 1, including detecting that the original image file does not have the first file characteristic corresponding to the target platform, wherein the detecting that the original image file does not have the first file characteristic corresponding to the target platform comprises:

accessing the original image file by calling a first predetermined interface, to determine an operating system type of an operating system in the original image file;

determining the target driver corresponding to both the operating system type and the target platform;

detecting whether an original driver in the original image file is different from the target driver; and in response to detecting that the original driver is different from the target driver, determining that the original image file does not have the first file characteristic.

4. The method according to claim 1, wherein the changing the original image file by calling the predetermined interface further comprises:

in response to detecting that the original image file does not have the second file characteristic, changing an original file format of the original image file to the target file format by calling a second predetermined interface.

5. The method according to claim 4, wherein the detecting that the original image file does not have the second file characteristic corresponding to the target platform comprises:

determining the target file format supported by the target platform;

detecting whether the original file format is different from the target file format; and in response to detecting that the original file format is different from the target file format, determining that the original image file does not have the second file characteristic.

6. The method according to claim 1, wherein the obtaining the original image file of the virtual machine on the original platform comprises:

obtaining the original image file from an image repository, wherein the image repository is configured to store an image file uploaded by a user.

7. A conversion server, wherein the conversion server comprises a processor and a memory connected to the processor, wherein the memory is configured to store one or more instructions, and the instructions are configured to be executed by the processor;

the processor is configured to obtain an original image file of a virtual machine on an original platform;

the processor is further configured to detect, automatically without user input, whether the original image file has a first file characteristic and a second file characteristic that are corresponding to a target platform, wherein the first file characteristic comprises a target driver used when the virtual machine runs on the target platform, and the second file characteristic comprises a target file format supported by the target platform; and the processor is further configured to: in response to detecting that the original image file does not have at least the first file characteristic, directly change the original image file by calling a predetermined interface without starting the original image file as a virtual machine before the change, to obtain a target image file of the virtual machine on the target platform, wherein the target image file has the first file characteristic and the second file characteristic, wherein the processor is further configured to:

in response to detecting that the original image file does not have the first file characteristic, replace an original driver in the original image file with the target driver by calling a first predetermined interface, wherein replacing the original drive includes:

deleting the original driver in a driver directory by calling the first predetermined interface; and writing the target driver into the driver directory.

8. The conversion server according to claim 7, wherein the processor is further configured to:

determine a driver directory in the original image file according to an operating system type of an operating system in the original image file, wherein the driver directory is a default directory in which a driver of an operating system of the operating system type is located; and replace the original driver in the driver directory with the target driver by calling the first predetermined interface.

9. The conversion server according to claim 7, wherein the processor is further configured to:

access the original image file by calling a first predetermined interface, to determine an operating system type of an operating system in the original image file;

determine the target driver corresponding to both the operating system type and the target platform;

detect whether an original driver in the original image file is different from the target driver; and in response to detecting that the original driver is different from the target driver, determine that the original image file does not have the first file characteristic.

10. The conversion server according to claim 7, wherein the processor is further configured to:

in response to detecting that the original image file does not have the second file characteristic, change an original file format of the original image file to the target file format by calling a second predetermined interface.

11. The conversion server according to claim 10, wherein the processor is further configured to:

determine the target file format supported by the target platform;

detect whether the original file format is different from the target file format; and in response to detecting that the original file format is different from the target file format, determine that the original image file does not have the second file characteristic.

12. The conversion server according to claim 7, wherein the processor is further configured to obtain the original image file from an image repository, wherein the image repository is configured to store an image file uploaded by a user.

* * * * *